Dec. 22, 1964   O. H. BIGGS ETAL   3,162,373
RUNWAY LIGHTING SYSTEM
Original Filed Jan. 30, 1958   4 Sheets-Sheet 1
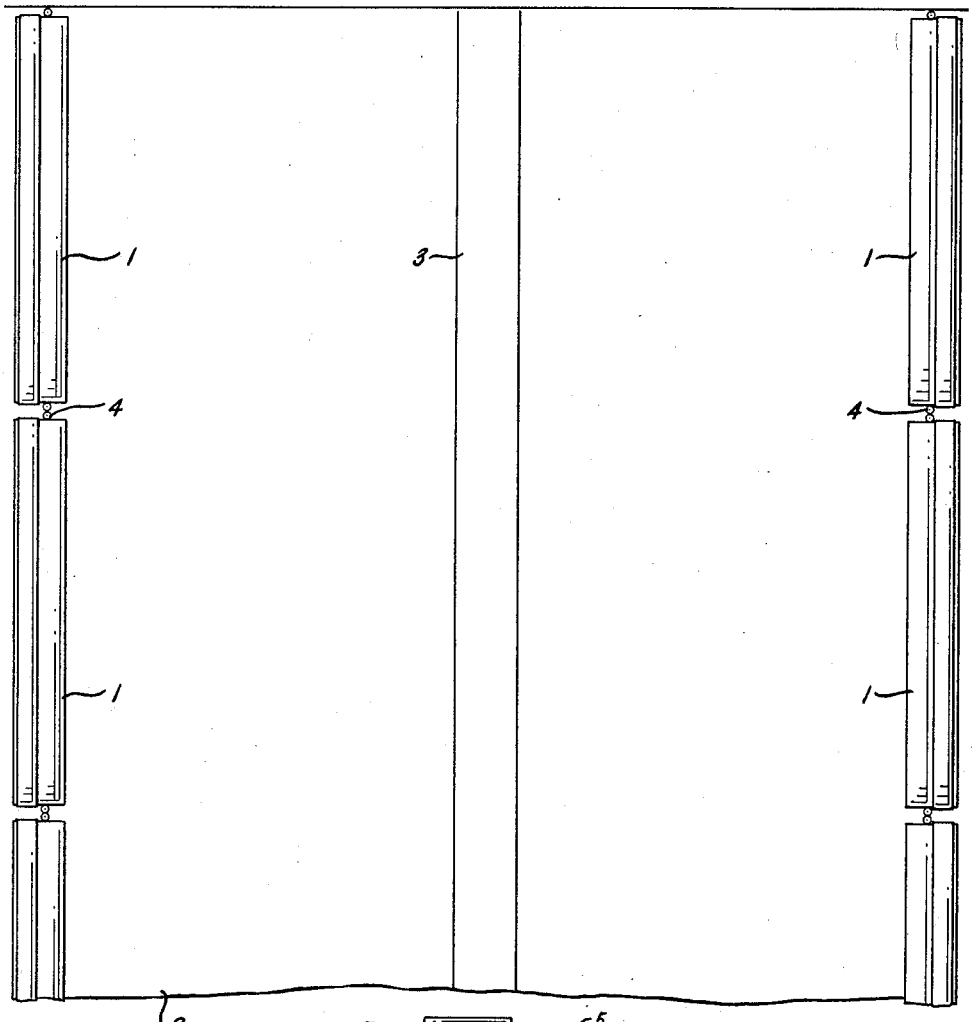
Fig_1
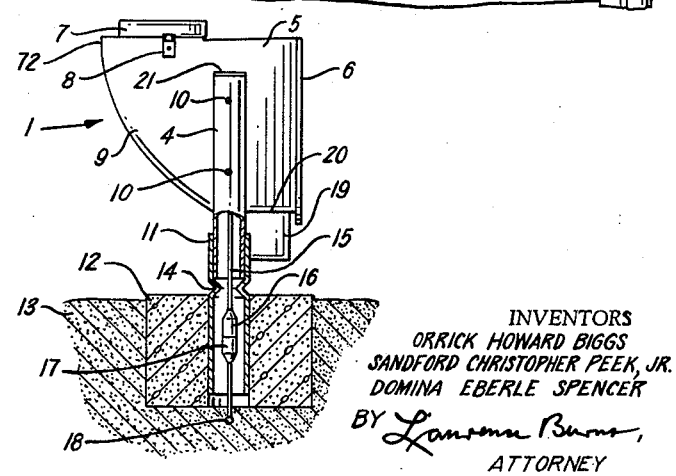
Fig_2
INVENTORS
ORRICK HOWARD BIGGS
SANDFORD CHRISTOPHER PEEK, JR.
DOMINA EBERLE SPENCER
BY Lawrence Burns,
ATTORNEY Dec. 22, 1964     O. H. BIGGS ETAL     3,162,373
RUNWAY LIGHTING SYSTEM
Original Filed Jan. 30, 1958     4 Sheets-Sheet 2

INVENTORS
ORRICK HOWARD BIGGS
SANDFORD CHRISTOPHER PEEK, JR.
DOMINA EBERLE SPENCER
BY Lawrence Burns,
ATTORNEY Dec. 22, 1964   O. H. BIGGS ETAL   3,162,373
RUNWAY LIGHTING SYSTEM
Original Filed Jan. 30, 1958   4 Sheets-Sheet 4
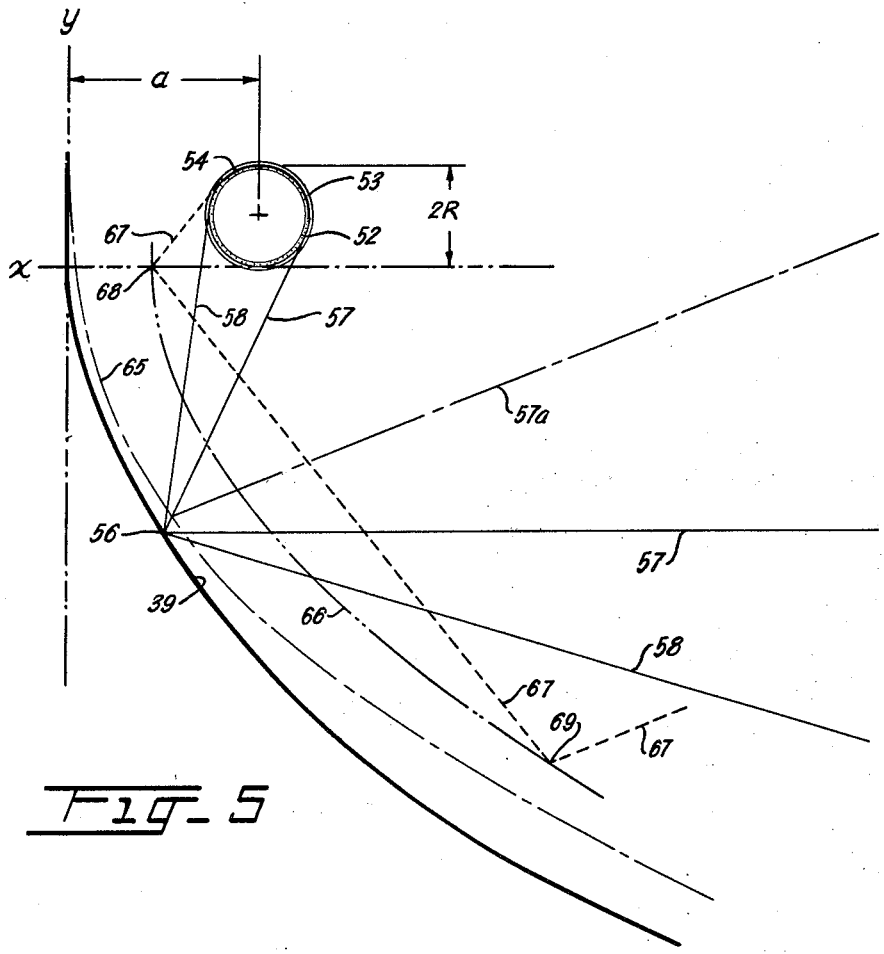
_Fig_5
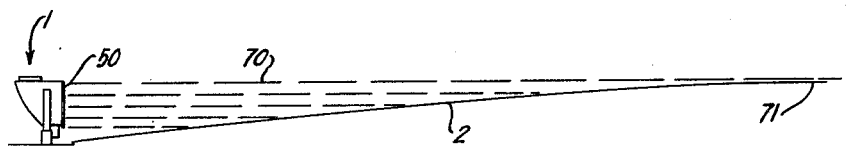
_Fig_6
INVENTORS
ORRICK HOWARD BIGGS
SANFORD CHRISTOPHER PEEK, JR.
DOMINA EBERLE SPENCER
BY
ATTORNEY 3,162,373
RUNWAY LIGHTING SYSTEM
Orrick H. Biggs, Beverly, Domina E. Spencer, Cambridge, and Sandford C. Peek, Jr., Hamilton, Mass., assignors to Sylvania Electric Products Inc., a corporation of Delaware
Continuation of application Ser. No. 712,203, Jan. 30, 1958. This application Dec. 12, 1962, Ser. No. 247,432
6 Claims. (Cl. 240—1.2)

This invention relates to the illumination of generally horizontal areas such as roadways and the like, and is especially effective for the lighting of airport runways.

Such runways have previously been lighted by a series of lamps spaced considerably apart high above the runway. To a pilot approaching the runway, such a series of lamps appeared as a series of blobs of light against a dark background, and give him no satisfactory indication of the level and position of the runway surface itself. In the last few moments of landing the pilot has to guess at the height of his wheels above the runway surface, and to some extent also as to the exact direction of the runway, because the lights look like an unrelated series of illuminated dots on a plane facing him, with no adequate indication of the relative distance of each dot away from him.

In short, as he gets close to the runway, the pilot is faced at best with a "black hole" into which he has to fly, and has to land his plane on a runway surface that he cannot see. What he sees is a series of lights; what he wants to see is the runway.

Our invention illuminates the runway surface, thereby enabling the pilot to see it and establish its position and level. The "black hole" between the two rows of lights is eliminated, and the pilot gets a three-dimensional view which enables him to land at night under conditions nearer to those of daylight.

Such a three-dimensional view depends upon the surface texture of the runway, as well as upon perspective, binocular vision and the like. The texture of the surface is emphasized by our invention because the illumination is at grazing angles, which makes the position of the surface more evident to the observer.

The lighting system of our invention is especially effective in heavy fog, because it reduces confusing stray light to a minimum yet completely illuminates the runway surface itself.

This result is achieved by sending a beam of substantially horizontal light transversely across the runway from a position only slightly above the edge of the runway surface. The beam is free from any upward components which could reach the eyes of the pilot, so that he does not see the lights but sees only the illuminated runway.

An attempt has previously been made to provide a horizontal beam of light across a runway, but incandescent lights were used as the source, with a circular reflector directing light over a horizontal angle or azimuth of 180° to 360°. Such units had to be spaced far apart, which resulted in spotty, non-uniform illumination of the runway. The upward component was not completely eliminated, and because the light was spread over such a large horizontal angle, could get directly into the pilot's line of vision, and in addition would cause confusion due to scattering in heavy fog.

When there is fog along the runway, the best angle for illuminating it is slightly greater than 90° to the longitudinal axis of the runway, the zero-degree direction being taken along the axis in the direction of an incoming airplane. In other words, the light should be directed nearly transverse to the runway but pointing slightly away from the end of the runway where the plane begins to come in for a landing.

In most cases, however, it is sufficient to orient the light in a direction at about 90° to the runway. The units can then be used in continuous rows.

To confine the light to an angle near 90°, both to keep it out of the eyes of the pilot in any kind of weather, and to direct it at an angle which produces a minimum of scattering in fog, vertical louvers can be used along the length of the units.

Our invention eliminates all the above difficulties by using an elongated tubular discharge lamp, such as a fluorescent lamp, as the source of light, with an elongated reflector curved in only one direction, that is, in a plane transverse to the runway, with the lighting units being arranged in a substantially continuous line. With a series of such units set end to end along the runway, most of the light is directed transversely across the latter, and substantially all of the light is directed at or below the horizontal, thereby being visible to the pilot only when reflected from the roadway or from some objects on the roadway. Markings raised slightly from the roadway are especially effective under such illumination.

To insure that no substantial amount of light is directed above the horizontal, in one embodiment of the invention a curved reflecting surface is used for the light from the bottom portion only of the lamp, the front top portion of the fixture being flat, with the lamp set in the rear above the flat portion. In that way, the lamp itself is shielded from the pilot and cannot be seen by him from above.

The bottom reflecting surface is designed so that with a tubular light source of finite cross-section emitting light around its cylindrical surface, the highest ray reflected from it is horizontal, and the rays from other portions of the lamp will be reflected below the horizontal. To achieve that result, the curve of the reflector will be a "tangent parabola" or a "divergent parabola," that is, it will diverge from its axis more than a parabola would at any point, other than the apex, and the amount of divergence, will increase as the reflecting point is taken further and further from the lamp, and as the lamp diameter increases.

In order to protect the fixture from dust and weather conditions, the otherwise open end should be closed by a clear plate of glass or other light-transmitting material. The use of such a plate, however, introduces further difficulties, because some light directed downwardly by the reflector will be reflected from the surface of the glass back toward the reflector and if it reaches the latter will be reflected therefrom at an angle above the horizontal. To prevent such an effect the reflector is terminated a sufficient distance from the plate to prevent such glass-reflected rays from reaching it at any angle at which they would be reflected upwardly through the glass plate.

Only the portion of the reflector nearest the glass plate need be omitted to prevent such reflection, because the glass-reflected rays which reach the reflector farther back will merely be reflected upward into the fixture itself, toward the non-reflecting upper shield, and will cause no difficulty.

The internal ends of the fixtures can be blackened to prevent reflection, and the louvers can also be blackened.

The reflector construction is best made frangible, of thin sheet material, say 16-gauge aluminum, with as few stiffening ribs as possible, so that it can be easily bent by the wheels of a plane in case of accident, and will not become a serious obstacle under such conditions.

In order to utilize some of the upward and otherwise wasted light from the fluorescent lamp, we prefer to place a reflecting coating on the upper surface of the lamp, either on the inside or outside surface of the lamp tube. The coating may extend over a distance of about one-third the lamp circumference, for example over an angle of about 135°, and can cover that part of the lamp from which the rays would otherwise be absorbed by the non-reflecting top portion of the fixture.

Such a reflector on the lamp surface differs from one outside the lamp, in that it reflects light back through the lamp so that the reflected light falls on the fluorescent coating in the lamp and is diffused by it. In effect, the light from the useful part of the coating is merely increased, and no change is needed in the remainder of the optical system because of the additional light.

A suitable curve for our reflector can be drawn by tracing the rays from the cross-section of the lamp and determining the curve graphically by a series of successive approximations. However, we have discovered that the correct curve has the shape determined by the following equations:

$$x = a + \frac{1}{2}\left[ y\left(p - \frac{1}{p}\right) - 2pR \right]$$

$$y = 2p(a - R \tan^{-1} p)$$

where "$p$" is the slope $dx/dy$ of the curve. It should be noted that this slope is the inverse of the more usual slope $dy/dx$. The symbol "$R$" is for the radius of the emitting surface of the lamp, that is, of its fluorescent coating, and the symbol "$a$" is the distance from the center of the lamp to the y-axis, the bottom of the lamp's emitting surface being tangent to the x-axis.

Even with the reflector shaped to the above curve, there is a possibility of upward light from interflections, that is, from double reflections. A ray of light, from the lamp, may hit the reflector at such a large angle to the normal that it will be reflected downwardly at an angle such that it does not emerge from the fixture but falls on a lower portion of the reflector, from which is it reflected upwardly.

The reflector should not extend beyond the place at which such second reflections begin. We have found that the limiting ray for this purpose is the ray which meets the curve at the x-axis and is tangent to a point on the upper rear portion of the lamp's emitting surface. The point to which that ray is reflected back on the curve is the limit to which the curve can extend without interflections.

The smaller the lamp radius "$R$," or the larger we make the distance "$a$" from the lamp to the intersection of the curve with the x-axis, the longer the reflecting curve can be, and the greater the portion of the lamp's surface that the reflector can use.

The opening or window through which the reflected light passes can extend vertically from the point on the curve where interflections begin to a horizontal line passing through the center of the lamp. All light above this horizontal line should be shielded from the roadway so that no upward light directly from the lamp will emerge from the fixture.

In order to insure the reflection of sufficient light onto the runway, we use as the elongated light source the so-called VHO (very high output) fluorescent lamps, such as shown in United States patent application Serial No. 656,356, filed May 1, 1957, now Patent No. 3,013,175, by John F. Waymouth et al., which take about 25 watts per linear foot of lamp tube.

Other objects, features, and advantages of the invention will be apparent from the following specification taken in connection with the accompanying drawings in which:

FIGURE 1 is a plan view of a part of a runway according to one embodiment of the invention;

FIGURE 2 is a side view partly in section of a lighting fixture according to the same embodiment, set into the ground at the edge of the runway;

FIGURE 5 is a view showing a lamp in reflecting relationship to a parabolic reflector and also to a reflecting curve according to one embodiment of the invention; and FIGURE 6 shows a cross-sectional view of the runway with a lighting fixture such as that shown in FIGURE 2 at each edge.

Figure 3:
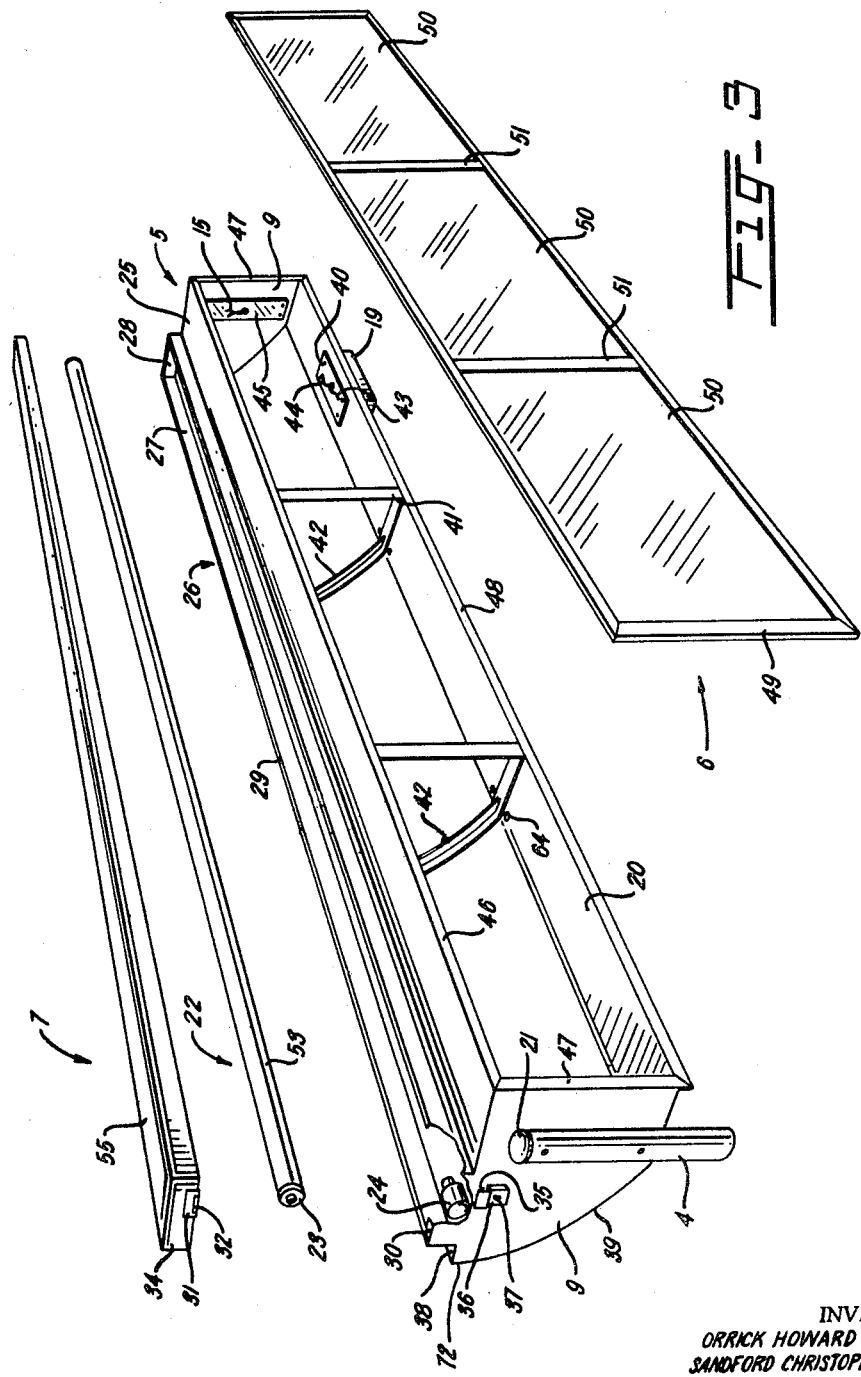
FIGURE 3 is a perspective view of the same fixture, showing its various parts.

In FIGURE 1 the lighting fixtures 1 are set up along the outside edges of the runway 2, which has the white strip 3 down the center thereof for guidance purposes. The runway can be of standard asphalt, concrete or other construction and rises gradually in height toward the center; that is its edges are low and it rises above the ground level to a crown at its center. The strip 3, which may be for example three feet wide runs along the crown. The fixtures are arranged to direct light at a glancing, substantially horizontal angle over most of the runway from the edges to the crown, as will be clear from other figures.

The lighting fixtures are linear in extent and run along the edges of the runway in substantially continuous lines. In the embodiment shown in FIGURE 1 they are spaced apart slightly in a longitudinal direction to make room for the vertical pipes 4 which act as supports for the fixtures, and through which the electrical connections to the fixture run.

As shown in FIGURE 2 each fixture 1 comprises a metallic enclosure 5 having a front panel 6 of transparent clear glass, and a detachable top cap 7 through which lamps may be inserted and removed. Cap 7 is held to the unit by the latch 8, and the pipe 4 is attached to the side 9 of the enclosure 5 in some convenient manner, for example by the screws 10. At its bottom end, the pipe 4 fits into a frangible coupling 11 which is set into the concrete block 12 in the ground 13.

A frangible coupling 11 has an inwardly directed groove 14 which acts as a stop to limit the downward travel of the vertical pipe 4 and also serves to provide a breaking-off point if pressure is exerted on the whole system as by an airplane's crashing into it. Power line 15 runs from the enclosure 5 through pipe 4 down to a plug 16 which fits into a socket 17, connected in turn to the main power line 18 which runs through the ground in a protecting conduit (not shown) in the usual manner for runway power lines. Transformer casing 19 extends downward from the flat bottom 20 of the enclosure 5.

The pipe 4 is closed at its top end by a cap 21, which can be attached in any convenient manner. The fixture 1 is shown in more detail in FIGURE 3. An elongated fluorescent lamp 22 having at each end a contact base 23 of the usual type, one such type of base being shown for example in copending application Serial Number 637,196, filed January 30, 1957, now Patent No. 2,995,723, by William Morgan fits between suitable lampholders 24, each of said lampholders being attached to one end 9 of the enclosure 5 near the top of said enclosure. Enclosure 5 has a flat top 25 near the rear of which the enclosure extends upwardly at right angles to the flat portion 25 to form a parallelepiped 26 having the longitudinal side 27 and the shorter linear side 28 and being open at its bottom so as to be in communication with the interior of enclosure 5 and being open at its top to permit the easy insertion of lamp 22 therein. The top opening has the indirectly-extending edges or flanges 29 and 30, and over these and around the sides 27, 28, the top cap 7 fits to close the enclosure. A metal piece 31 with its bottom edge 32 curved upward is attached to the short end 34 of said cap and locks inside the downwardly-directed edge 35 of the bottom portion 36 of latch 8. The portion 36 can be held to the side 9 by a screw 37. On the rear side of the parallelepiped 26, the flat portion 38 extends backward a short distance, after which it turns downwardly and forwardly in a curve forming reflector 39 until at the bottom of the curve it extends outward substantially horizontally in the flat portion 20.

Enclosure 5 which is made of thin sheet aluminum, for example No. 16 gauge, is mounted accurately in position by the stiffening braces 41 set at intervals along its length, said members themselves having stiffening bands 42 where said braces extend over the surface of reflector 39. As will be understood later the curvature of the reflector must be accurately fixed and positioned.

At one end of the flat portion 20, a transformer casing 19 extends downwardly therefrom being held by a flanged portion 40 on top of the transformer said flanged portion 40 being fixed to the flat portion 20 of the enclosure. The transformer in casing 19 is electrically connected to the lamp bases 23 in the usual manner from its lead-in- wires 43, 44. The full length of these wires leading to the lamp holders 24 and the power supply line 15 are omitted for convenience, but the connections can be of the standard type and can utilize a standard circuit.

The power line 15 extends through a bushing 45 at one end 9 of the enclosure 5 into the pipe 4 as previously described. The top edge 46 and the side edges 47, at the open front of enclosure 5, are turned inwardly, and the bottom edge 48 turned outwardly, to form flat flanges which receive the outer frame 49 of the front panel 6 which holds the transparent glass plates 50 through which light is transmitted outwardly toward the runway 2. Additional supporting pieces 51 can be set into the front panel 6 to further support the same, and are preferably made to coincide in position with the front of the stiffening braces 41 inside the enclosure, to prevent additional light loss. The panel 6 can be fixed to the flanges 46, 47, 48 in any convenient manner, for example by screws of a type designed for use with sheet metal. A few small breathing holes 64 may be provided along the top portion of the reflecting curve 39 to permit a small circulation of air into and out of the enclosure 5.

Figure 4:
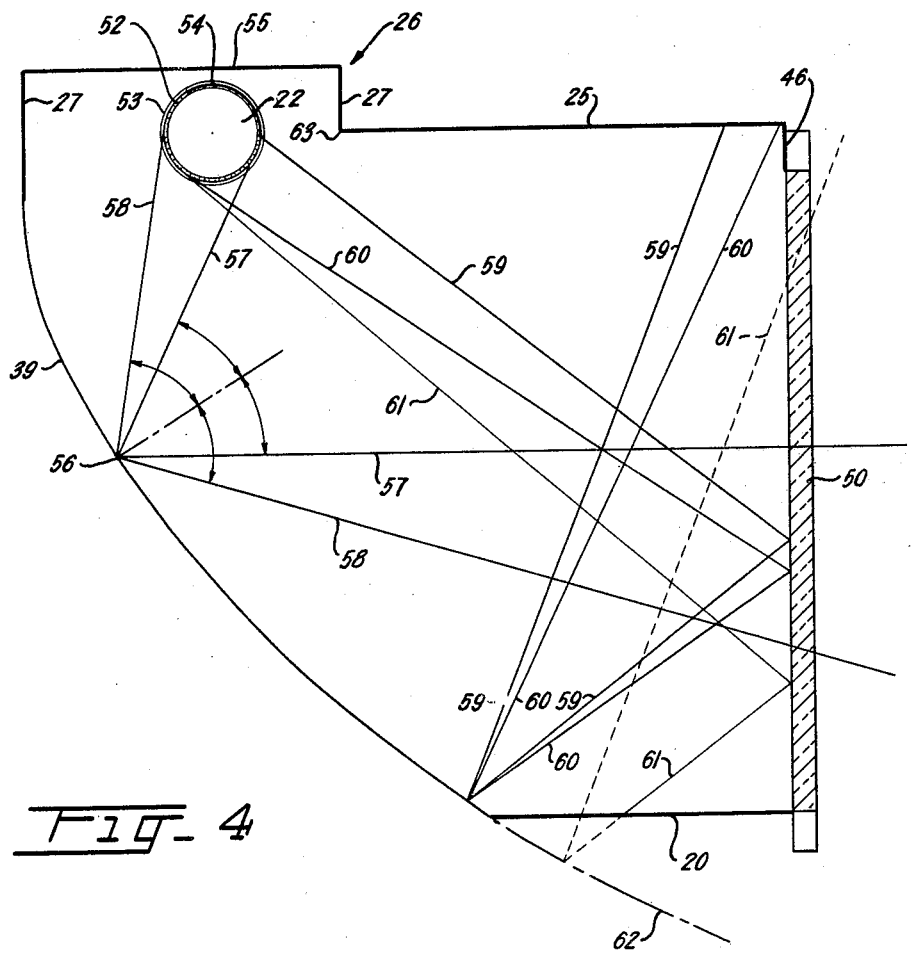
FIGURE 4 is a schematic sectional view of the same fixture showing the paths of the various light rays.

In FIGURE 4 the manner in which the light is provided and directed by the fixture 1 is shown schematically. The lamp 22 shown in the previous figure is a fluorescent lamp, and can be of the type having a fluorescent coating 52 shown schematically in FIGURE 4 as a circle, on the inner surface of the tubular glass envelope 53 of the fluorescent lamp 22. Between the fluorescent coating 52 and the tubular glass envelope 53, over part of the circumference of the tube, there can be a reflecting coating 54, for example of fine titanium dioxide powder.

All light emerging from the fluorescent coating 52 at angles above the horizontal is cut off and prevented from reaching the outside of the fixture 1 by the shielding effect of the side 27 of the parallelepiped 26, surrounding the top of the lamp 22, and further by the front edge 46 of the fixture and are painted flat black to insure substantially complete absorption of all light which these edges are intended to shield. The inside surface of edge 46, flat portion 25, side 27, top portion 55 of cap 7 and the top edge of the rear side 27 of the parallelepiped 26 absorb substantially all light emitted by the lamp at angles above the horizontal.

The reflector 39 has a curvature such that light reaching it from the lamp is reflected in a direction substantially at or below the horizontal. To insure this, the curvature is such that the tangent to the fluorescent coating 52 at the extreme forward part of the fluorescent coating 52 from which light directly reaches a particular point, such as point 56, is reflected in a horizontal direction 57 and then the ray from the extreme rearward part of the fluorescent coating 52 will then be reflected slightly below the horizontal, as shown by ray 58.

The curvature of reflecting curve 39 could therefore of itself reflect all rays at or below the horizontal if the front end of the reflector were completely open. However, it is desirable to protect the interior of enclosure 5 by using a transparent clear glass plate 50 across its open end and this transparent surface will reflect a certain small proportion of light backward onto the reflector 39. This is especially true of rays which reach the transparent glass plate 50 at angles other than the normal. For example, rays 59 and 60 from the fluorescent coating 52 will be reflected back from glass plate 50 onto the reflector 39 and in turn reflected therefrom upwardly onto the flat-back coating on the interior surface of the flat portion 25. They will be absorbed there and will not leave the fixture.

However, other rays such as ray 61 might fall on a lower part of the transparent plastic panel 50 and, if the reflector extended downwardly to region 62, would be reflected upwardly out of the enclosure 5 through panel 50 and might reach the eyes of the pilot of an incoming airplane. For that reason we either blacken the bottom portion of the reflector 39 or omit it entirely as shown in the figures and replace it by the flat portion 20 which in turn is blackened on its interior to avoid reflection. The blackened flat portion 20 should then extend from the inside of the light transmitting glass plate 50 to a part of the reflector 39 from which rays would be reflected just inside the blackened edge 46 of the front of the reflector. The flat portion 20 can then be utilized for holding a transformer, such as transformer 19, if desired.

Since the light from the top portion of the fluorescent coating 52 is cut off anyway by the blackened interior of sides 27 and 55, we find it desirable to extend the reflecting coating 54 from a position beginning at a horizontal plane through the center of the lamp and extending upwardly and backwardly around the top of the lamp through an angle of about 135°. In this way substantially none of the useful light is cut off by reflector 54, and the otherwise wasted light through that angle of 135° is reflected back inside the lamp onto the fluorescent coating 52, from which it is emitted in substantially the same pattern as the light originating on the bottom portions of fluorescent layer 52. Accordingly we save a certain amount of light, increase the brightness of the exposed fluorescent coating 52, and do so without any necessity for re-arranging the optical set-up of the system, since all the light effectively emanates from the fluorescent surface 52.

FIGURE 5 is a schematic view, showing the extreme rays 57 and 58 which fall on a point 56 on reflector 39, from opposite sides of the lamp emitting surface 52. Ray 57 is reflected horizontally, and ray 58 below the horizontal. All other rays falling on point 56 from the lamp will be reflected between the horizontal and ray 58. Were the reflector a parabola, as in curve 65, the ray 57 would be reflected upwardly as shown in ray 57a, thereby defeating the purpose of the device.

Accordingly, applicants use a curve according to the equations previously given, were "R," "a," "x," and "y" have the meanings previously assigned, and indicated in FIGURE 5. The value of "R" can generally be taken as the outside radius of the lamp tube, because the tube wall thickness is usually quite small, about 0.04 inch for the usual 48-inch long, 1½" diameter tubes. The applicants' curve gives, for a lamp of finite dimensions, the actual type of curve which will reflect the rays at or below the horizontal, that is, at or below a line parallel to the x-axis.

The "x" and "y" axes are shown in the figure, the bottom of the emitting surface 52 of the lamp being tangent to the x-axis. In plotting the curve, a value can be taken for "R," which can be the radius of a standard-size lamp, for example 1½ inches, if a standard-size lamp of that diameter is to be used, and an arbitrary value taken for "a." A series of successive values, for example 0.5, 0.6, 0.7, etc., can be assigned for the slope "p," the equation solved for corresponding values of "x" and "y" for each of said slope values, and a curve plotted. A family of curves can be drawn, each curve being for a different value of "a," and a suitable curve selected from the family, the curve being selected so that "interflections" will not occur over the reflector length intended to be used.

The need for eliminating interflections is clear from a consideration of reflecting curve 66 in FIGURE 5. Ray 67 is reflected from a point 68, but is reflected at such a large angle downward that it falls on the curve 66 again at a lower point 69, from which it is reflected upwardly, which is undesirable. Such interflections should be minimized or eliminated.

To show how that can be done, we refer to ray 67 which is one meeting the curve 66 on the x-axis while being tangent to the lamp emitting surface 52 at the rear of the lamp. All other rays extending from the lamp to the curve will be reflected nearer the horizontal, and will hence fall on curve 66, if at all, at points farther from the lamp than point 69. Ray 67 is therefore the limiting ray, that is the ray which fixes the point on the curve below which interflections occur. The useful portion of the curve is the length along the curve from the x-axis to the point where ray 67 is reflected from curve 66 for the second time.

The useful portion is seen to be short for small values of "a," and to become larger as "a" is increased. A considerable length of curve is desirable in order to reflect as much light from the lamp as possible; the length of curve is preferably adjusted so that when the fixture is set with the x-axis in a horizontal plane and at a distance of about six inches above the edge of the runway, the top 70 portion of the beam just clears the crown 71 of the runway 2 under all conditions of weather and the like, as shown in FIGURE 6.

The dashed lines in that figure represent the horizontal rays such as ray 57.

In a specific example such as that described above, the runway 2 was 6000 feet long and 200 feet wide with the crown varying from 12 to 30 inches above the edges. Beginning about 500 feet from the incoming end of the runway, that is from the end at which airplanes normally come in for landing the fixtures 1 were set along opposite edges of the runway for a distance of about 1500 feet with the top 55 of cap 7 being about 30 inches above the level of the edge of said runway.

Each of the fixtures 1 was about 96 inches long, from end to end, with the pipe 4 at each end being about 2 inches in diameter. From the flat portion 20 to the top 55 the distance was about 12 5/16 inches with the vertical edges of the top cap 7, in place, extending about 1 inch above the flat portion 25 at the top of the reflector. (To provide proper drainage it may be desirable to make the forward edge 27 of opening 26 to a depth of about 1¼ inches and to make the front flat portion 25 slant to that depth from a distance of about 1 inch below the plane of the top 55 of cap 7 at intersection of flat portion 25 and flange 46.) The flat portion 25 and the upwardly extending side 27 are preferably made of a single piece of sheet metal to prevent leakage of water into the fixture during a storm.

The top 55 of cap 7 was about 30 inches from the ground, and the distance from the flat portion 20 to the flat portion 25 was about 10¾ inches, the edge 46 being about ¾" wide. The distance between opposite sides 27 of the upwardly extending enclosure at the top of the fixture 1 was 5 inches. The projection of reflector 39 along the x-axis was about 7 3/16 inches, and the reflector and the ¾-inch high flat portion 72 above the x-axis, were formed from a metal piece having a length of 13 7/16 inches prior to being curved. The rear flat portion 38 was about 1¼ inches long and the flanges 29 about ⅝ inch long. The flat portion 20 was ⅞ inch wide. The entire interior of the fixture above the x-axis of reflector 39 was painted with a non-reflective flat black coating, as was also the flat portion 20 and the entire brace 41 with its stiffening member 42.

The lamp used was a VHO (very high output) fluorescent lamp about 4 feet long and 1½ inches in diameter with an input of 200 watts. Such a lamp is described for example in United States patent application Serial No. 656,356, filed May 1, 1957, by John F. Waymouth et al. The lamp was placed with its center about 3 inches ahead of the flat portion 27 at the top of reflector 39, and about 1 inch below the flange 39, but in any event should be oriented with the reflector curve as in FIGURE 5.

In plotting the reflector curve a value of 1½ inches was taken for the radius "R" and a value of 3 inches for "a." The braces 41 were about 1 inch wide and were made of ⅜ inch thick aluminum. The reflector 39 was made of aluminum 0.032 inch thick, covered with a thin coating of Mylar, a water-repellent plastic protective coating of polyethylene terephthalate, in the usual manner. So-called "anodized aluminum," often known as Alzak, or other suitable material could be used instead of the Mylar-coated aluminum.

The glass panes 50 were 11 inches high and 32 1/16 inches long. The flat portion 25 and the end plates 9 were of .032 aluminum stock. The breathing holes 64 were of about ¼ inch diameter.

Since the tops of the fixtures were mounted about 30 inches above the ground at the edges of the runway, and part of the runway had a crown only 12 inches above the edge, the fixtures on the low-crown portion were tilted downward about 1° from the horizontal to properly cover the runway with light. On the portion of the runway with a 30-inch high crown a very slight upward tilt, about 4 minutes (i.e., about 1/15 of one degree) above the horizontal in angle, was given to the fixture, but that slight angle above the horizontal was, of course, negligible.

Tilting the fixture substantially upward is, of course, undesirable for the same reasons that allowing upward reflectionst in the fixture itself in undesirable. It is also undesirable for an additional reason, namely, that if the fixture is tilted upward from a level below the crown 71, there will be a shadow at the crown. There should, moreover, be no appreciable light at an upward angle such that it would hit the eyes of a pilot in the pilot's lowest position that is about 14 feet above the runway with the plane on the ground.

In the example described, the end plates 9 were painted a non-reflective flat black on their inside surfaces to act as baffles, thus insuring that most of the light from the reflector is directed transversely to the runway. Additional baffles, painted flat black, at least on the side toward an airplane normally approaching the runway, can be used between the end plates to confine the light still more closely to the transverse direction, but will not generally be necessary.

Although for convenience the invention has been described in connection with a particular embodiment it will be understood that a person skilled in the art can make various modifications and changes therein without departing from the spirit and scope of the invention.

This application is a continuation of our United States patent application Serial No. 712,203, filed January 30, 1958, now abandoned.

We claim:

1. An electric lighting fixture comprising: an elongated hollow tubular light-emitting fluorescent surface having a longitudinal axis and a substantially circular cross-section perpendicular to said axis; a reflector in position to reflect away from said surface the light emitted from a first portion of said surface, said reflector having a longitudinal axis parallel to the longitudinal axis of said fluorescent surface, the curve of said reflector in a plane transverse to its longitudinal axis having its own axis tangent to the circular cross-section of said fluorescent surface, said reflector being substantially entirely on the side of said tangent axis opposite the side on which said fluorescent surface is positioned; a second reflector extending closely around a second portion of said fluorescent surface whose light is directed away from said reflector, to reflect the light from said second portion back onto said first portion of said fluorescent surface to increase the light intensity of said first portion of said surface; and a shield for all light emitted directly from said fluorescent surface in directions away from said reflector.

2. The combination of claim 1, in which the shield extends around the lamp to the axis of the reflector tangent to the fluorescent surface.

3. The combination of claim 1, in which the second reflector extends over substantially 135° of the circumference of the fluorescent surface.

4. The fixture of claim 1, in which the reflector has a curvature substantially as determined by the following equations:

$$y = a + \frac{1}{2}\left[y\left(p - \frac{1}{p}\right) - 2pR\right]$$
$$x = 2p(a - R \tan^{-1} p)$$

the $x$-axis being taken in a horizontal plane tangent to the fluorescent surface and the $y$-axis in a plane perpendicular thereto, the $x$ and $y$ axis defining a plane transverse to the longitudinal axis of said surface, the symbol $p$ denoting the slope $dx/dy$ of the reflector curve, the symbol $R$ denoting the radius of the lamp and the symbol $a$ denoting the distance between the center of the lamp and the $y$-axis, and being large enough to prevent double reflections from the reflector.

5. The combination of claim 1, in which the shield extends around the lamp to the axis of the reflector tangent to the fluorescent surface, the second reflector extending over about 135° of the circumference of said surface, and in which the reflector has a curvature substantially as determined by the following equations:

$$y = +\frac{1}{2}\left[y\left(p - \frac{1}{p}\right) - 2pR\right]$$
$$x = 2p(a - R \tan^{-1} p)$$

the $x$-axis being taken in a horizontal plane tangent to the fluorescent surface and the $y$-axis in a plane perpendicular thereto, the $x$ and $y$ axis defining a plane transverse to the longitudinal axis of said surface, the symbol $p$ denoting the slope $dx/dy$ of the reflector curve, the symbol $R$ denoting the radius of the lamp and the symbol $a$ denoting the distance between the center of the lamp and the $y$-axis, and being large enough to prevent double reflections from the reflector.

6. A lighting fixture comprising an elongated tubular discharge lamp and a reflector below said lamp and shaped to reflect the light therefrom in directions not substantially above the horizontal, an absorbing shield above said lamp and in position to absorb all upward light from said lamp, a clear transparent plate extending downward from said shield to a position in front of and spaced forward from said reflector, and a light-absorbing material extending from the forward portion of said reflector to the bottom of said plate.

References Cited in the file of this patent
UNITED STATES PATENTS

| | | |
|---|---|---|
| 1,867,138 | Christman | July 12, 1932 |
| 1,912,487 | Matera | June 6, 1933 |
| 2,270,474 | Recher | Jan. 20, 1942 |
| 2,887,567 | Dameral | May 19, 1959 |